(12) United States Patent
Wu et al.

(10) Patent No.: US 12,089,250 B2
(45) Date of Patent: Sep. 10, 2024

(54) CHANNEL ACCESS PROCEDURE BASED ON CHANNEL ACCESS PRIORITY CLASS

(71) Applicant: Nokia Technologies Oy, Espoo (FI)

(72) Inventors: Chunli Wu, Beijing (CN); Samuli Turtinen, Ii (FI); Tao Tao, Shanghai (CN); Timo Lunttila, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 383 days.

(21) Appl. No.: 17/626,672

(22) PCT Filed: Aug. 13, 2019

(86) PCT No.: PCT/CN2019/100450
§ 371 (c)(1),
(2) Date: Jan. 12, 2022

(87) PCT Pub. No.: WO2021/026783
PCT Pub. Date: Feb. 18, 2021

(65) Prior Publication Data
US 2022/0408456 A1 Dec. 22, 2022

(51) Int. Cl.
*H04W 72/566* (2023.01)
*H04W 72/23* (2023.01)
*H04W 74/0808* (2024.01)

(52) U.S. Cl.
CPC ......... *H04W 72/566* (2023.01); *H04W 72/23* (2023.01); *H04W 74/0808* (2013.01)

(58) Field of Classification Search
None
See application file for complete search history.

(56) References Cited

U.S. PATENT DOCUMENTS

2017/0238334 A1    8/2017  Yang et al.
2018/0115981 A1*   4/2018  Kim .................. H04W 72/1215
(Continued)

FOREIGN PATENT DOCUMENTS

CN    107135461 A    9/2017
CN    109155713 A    1/2019
(Continued)

OTHER PUBLICATIONS

Extended European Search Report received for corresponding European Patent Application No. 19941567.0, dated Mar. 20, 2023, 11 pages.

(Continued)

*Primary Examiner* — Clemence S Han
(74) *Attorney, Agent, or Firm* — Robert P. Michal, Esq.; Carter, DeLuca & Farrell LLP

(57) ABSTRACT

Embodiments of the present disclosure relate to devices, methods, apparatuses and computer readable storage media of channel access procedure based on the channel access priority class (CAPC). The method comprises receiving scheduling information from a second device, the scheduling information at least indicating resources allocated for a transmission from the first device to the second device, a channel access type for the transmission and an expected access priority for the transmission. The method further comprises comparing the expected access priority with an access priority of data in a buffer of the first device and determining use of the resources based on the comparison. In this way, the Channel Occupancy Time (COT) sharing can be used only for the data with higher or equal priority to avoid unintended usage of the grant on unlicensed band and coexistence fairness among nodes with different types of traffic to be transmitted may be achieved.

1 Claim, 4 Drawing Sheets

(56) References Cited

U.S. PATENT DOCUMENTS

| | | | |
|---|---|---|---|
| 2018/0255578 A1* | 9/2018 | Kim | H04W 74/0808 |
| 2019/0037582 A1* | 1/2019 | Noh | H04L 5/0094 |
| 2019/0098658 A1* | 3/2019 | Noh | H04L 27/2601 |
| 2019/0174489 A1 | 6/2019 | Dinan | |
| 2020/0275430 A1* | 8/2020 | Salem | H04L 5/001 |
| 2020/0344819 A1* | 10/2020 | Myung | H04W 74/0841 |
| 2020/0404648 A1* | 12/2020 | Kim | H04L 5/0044 |
| 2020/0413444 A1* | 12/2020 | Shi | H04W 74/02 |
| 2021/0153245 A1* | 5/2021 | Tooher | H04W 74/008 |
| 2021/0195639 A1* | 6/2021 | Kim | H04W 16/14 |
| 2021/0298080 A1* | 9/2021 | Wu | H04W 74/006 |

FOREIGN PATENT DOCUMENTS

| | | |
|---|---|---|
| CN | 109155720 A | 1/2019 |
| CN | 109891987 A | 6/2019 |
| EP | 3435580 A1 | 1/2019 |
| EP | 3609284 A1 | 2/2020 |
| EP | 3726919 A1 | 10/2020 |
| KR | 20170127634 A | 11/2017 |
| KR | 20180039501 A | 4/2018 |
| WO | 2017/074638 A1 | 5/2017 |
| WO | 2017/164719 A1 | 9/2017 |
| WO | 2019/035624 A1 | 2/2019 |

OTHER PUBLICATIONS

"LBT schemes in LAA UL", 3GPP TSG RAN WG1 meeting #84, R1-160630, Agenda: 7.3.1.5, LG Electronics, Feb. 15-19, 2016, 10 pages.

"3rd Generation Partnership Project; Technical Specification Group Radio Access Network; Physical layer procedures for shared spectrum channel access (Release 15)", 3GPP TS 37.213, V15.2.0, Mar. 2019, pp. 1-20.

"3rd Generation Partnership Project; Technical Specification Group Radio Access Network; Evolved Universal Terrestrial Radio Access (E-UTRA); Multiplexing and channel coding (Release 15)", 3GPP TS 36.212, V15.6.0, Jun. 2019, pp. 1-246.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", 3GPP TS 36.300, V15.5.0, Mar. 2019, pp. 1-363.

"3rd Generation Partnership Project; Technical Specification Group Radio Access Network; NR; Medium Access Control (MAC) protocol specification (Release 15)", 3GPP TS 38.321, V15.5.0, Mar. 2019, pp. 1-78.

"3rd Generation Partnership Project; Technical Specification Group Radio Access Network; NR; Physical layer procedures for control (Release 15)", 3GPP TS 38.213, V15.6.0, Jun. 2019, pp. 1-107.

"Discussion on channel access for wideband operation and COT sharing", 3GPP TSG RAN WG1 #96bis, R1-1904587, Agenda: 7.2.2.2.1, Fujitsu, Apr. 8-12, 2019, 6 pages.

"On Channel Access Priority Class selection in NR-U", 3GPP TSG-RAN WG2 Meeting #106, R2-1906589, Agenda: 11.2.1.2, Nokia, May 13-17, 2019, 3 pages.

"Draft LS to RAN1 on the need for COT sharing between RA msg2 and msg3", 3GPP TSG-RAN WG2 #106, R2-1907599, Ericsson, May 13-17, 2019, 1 page.

"3rd Generation Partnership Project; Technical Specification Group Radio Access Network; Evolved Universal Terrestrial Radio Access (E-UTRA); Physical layer procedures (Release 15)", 3GPP TS 36.213, V15.6.0, Jun. 2019, pp. 1-551.

International Search Report and Written Opinion received for corresponding Patent Cooperation Treaty Application No. PCT/CN2019/100450, dated May 11, 2020, 9 pages.

"On Channel Access Procedure", 3GPP TSG RAN WG1 #96bis, R1-1904482, Agenda: 7.2.2.2.1, MediaTek Inc, Apr. 8-12, 2019, pp. 1-13.

Office Action received for corresponding Chinese Patent Application No. 201980099247.4, dated Feb. 27, 2024, 8 pages of Office Action and English translation, 6 pages, total 14 pages.

* cited by examiner

CHANNEL ACCESS PROCEDURE BASED ON CHANNEL ACCESS PRIORITY CLASS

RELATED APPLICATION

This application claims priority to PCT Application No. PCT/CN2019/100450, filed on Aug. 13, 2019 which is incorporated herein by reference in its entirety.

FIELD

Embodiments of the present disclosure generally relate to the field of telecommunication and in particular, to devices, methods, apparatuses and computer readable storage media of channel access procedure based on the channel access priority class (CAPC).

BACKGROUND

Two types for uplink channel access procedures for Listen Before Talk (LBT) have been defined in 3GPP for LTE unlicensed band operation. In LBT type 1, a channel access procedure uses exponential back-off with parameters depending on the CAPC of the LCHs within the TB. In LBT type 2, a channel access procedure has a fixed duration for channel sensing. Type 2 channel access procedures can only be applied within a shared Channel Occupancy Time (COT).

To facilitate a proper selection of the uplink data, the network device may indicate, to the terminal device, the value of CAPC in UL grant when performing a LBT procedure and initiating the COT. The Channel Access (CA) types, i.e. LBT type as well as the value of CAPC are explicitly signalled for the terminal device using Downlink Control Information (DCI) in the uplink grant and carried on Physical Downlink Control Channel (PDCCH).

SUMMARY

In general, example embodiments of the present disclosure provide a solution of channel access procedure based on the CAPC.

In a first aspect, there is provided a first device. The first device comprises at least one processor; and at least one memory including computer program codes; the at least one memory and the computer program codes are configured to, with the at least one processor, cause the first device at least to receive scheduling information from a second device, the scheduling information at least indicating resources allocated for a transmission from the first device to the second device, a channel access type for the transmission, and an expected access priority for the transmission. The first device is further caused to compare the expected access priority with an access priority of data in a buffer of the first device and determine use of the resources based on the comparison.

In a second aspect, there is provided a method. The method comprises receiving scheduling information from a second device, the scheduling information at least indicating resources allocated for a transmission from the first device to the second device, a channel access type for the transmission and an expected access priority for the transmission for the transmission. The method further comprises comparing the expected access priority with an access priority of data in a buffer of the first device and determining use of the resources based on the comparison.

In a third aspect, there is provided an apparatus comprises means for receiving scheduling information from a second device, the scheduling information at least indicating resources allocated for a transmission from the first device to the second device, a channel access type for the transmission and an expected access priority for the transmission; means for comparing the expected access priority with an access priority of data in a buffer of the first device; and means for determining use of the resources based on the comparison.

In a fourth aspect, there is provided a computer readable medium having a computer program stored thereon which, when executed by at least one processor of a device, causes the device to carry out the method according to the second aspect.

Other features and advantages of the embodiments of the present disclosure will also be apparent from the following description of specific embodiments when read in conjunction with the accompanying drawings, which illustrate, by way of example, the principles of embodiments of the disclosure.

BRIEF DESCRIPTION OF THE DRAWINGS

Embodiments of the disclosure are presented in the sense of examples and their advantages are explained in greater detail below, with reference to the accompanying drawings, where.

Throughout the drawings, the same or similar reference numerals represent the same or similar element.

DETAILED DESCRIPTION

Figure 1:
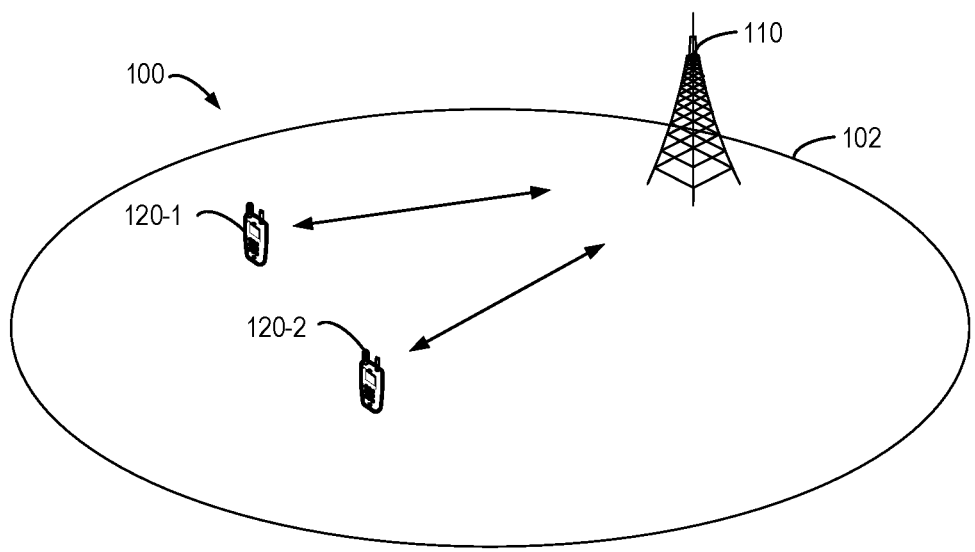
FIG. 1 shows an example communication network in which example embodiments of the present disclosure may be implemented.

The subject matter described herein will now be discussed with reference to several example embodiments. It should be understood these embodiments are discussed only for the purpose of enabling those skilled persons in the art to better understand and thus implement the subject matter described herein, rather than suggesting any limitations on the scope of the subject matter.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two functions or acts shown in succession may in fact be executed concurrently or may sometimes be executed in the reverse order, depending upon the functionality/acts involved.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), New Radio (NR) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future.

Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system. For the purpose of illustrations, embodiments of the present disclosure will be described with reference to 5G communication system.

The term "network device" used herein includes, but not limited to, a base station (BS), a gateway, a registration management entity, and other suitable device in a communication system. The term "base station" or "BS" represents a node B (NodeB or NB), an evolved NodeB (eNodeB or eNB), a New Radio (NR) NB (also referred to as a gNB), a Remote Radio Unit (RRU), a radio header (RH), a remote radio head (RRH), a relay, a low power node such as a femto, a pico, and so forth.

The term "terminal device" used herein includes, but not limited to, "user equipment (UE)" and other suitable end device capable of communicating with the network device. By way of example, the "terminal device" may refer to a terminal, a Mobile Terminal (MT), a Subscriber Station (SS), a Portable Subscriber Station, a Mobile Station (MS), or an Access Terminal (AT).

The term "circuitry" used herein may refer to one or more or all of the following:
(a) hardware-only circuit implementations (such as implementations in only analog and/or digital circuitry) and
(b) combinations of hardware circuits and software, such as (as applicable):
(i) a combination of analog and/or digital hardware circuit(s) with
software/firmware and
(ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

FIG. 1 shows an example communication network 100 in which embodiments of the present disclosure can be implemented. The network 100 includes a second device 110 (hereinafter may be referred as to a network device 110) and first devices 120-1 and 120-2 (hereinafter collectively referred to as first devices 120 or individually referred to as a terminal device 120) served by the network device 110. The serving area of the network device 110 is called as a cell 102. It is to be understood that the number of network devices and terminal devices is only for the purpose of illustration without suggesting any limitations. The network 100 may include any suitable number of network devices and terminal devices adapted for implementing embodiments of the present disclosure. Although not shown, it would be appreciated that one or more terminal devices may be in the cell 102 and served by the network device 110.

The communications in the network 100 may conform to any suitable standards including, but not limited to, New Raido (NR), Long Term Evolution (LTE), LTE-Evolution, LTE-Advanced (LTE-A), Wideband Code Division Multiple Access (WCDMA), Code Division Multiple Access (CDMA) and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

As mentioned above, two types for uplink channel access procedures for LBT have been defined in 3GPP for LTE unlicensed band operation. In LBT type 1, a channel access procedure uses exponential back-off with parameters depending on the CAPC of the LCHs within the TB. The CAPC for Uplink (UL) is represented in the table as below.

TABLE 1

Channel Access Priority Class for UL

| Channel Access Priority Class (p) | $m_p$ | $CW_{min,p}$ | $CW_{max,p}$ | $T_{ulmcot,p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} | where $CW_{min,p}$ may be referred to as minimum contention window size, $CW_{max,p}$ may be referred to as maximum contention window size, $T_{mcot,p}$ may be referred to as maximum channel occupancy time and $CW_p$ may be referred to as set of allowed contention window sizes.

In LBT type 2, a channel access procedure, which has a fixed duration for channel sensing. Type 2 channel access procedures can only be applied within a COT.

The CA types, i.e. LBT type as well as the value of CAPC are explicitly signalled for the terminal device using Downlink DCI in the uplink grant and carried on PDCCH.

For example, DCI format OA is used for the scheduling of Physical Uplink Shared Channel (PUSCH) in a Licensed Assisted Access (LAA) Secondary Cell (SCell), or activating/releasing autonomous UL transmission (AUL), or indicating AUL downlink feedback information (AUL-DFI) to a terminal device that is activated with AUL transmission.

Similar approach of indicating the channel access procedure for the terminal devices is likely to be applicable for New Radio-Unlicensed (NR-U) as well, with possibly more LBT types to be defined. More specifically, four channel access (LBT) categories (category 1 LBT without channel sensing; category 2 LBT with 16 us sensing duration; category 2 LBT with 25 us sensing duration; and category 4 LBT with exponential back-off) are being discussed in NR-U. Category 2 LBT corresponds to LBT Type 2, and category 4 LBT corresponds to LBT Type 1.

For UL channel access type 2 with COT sharing, the assumption is that the network device has initiated the channel occupancy using category 4 LBT, and the UL transmission occurs within the channel occupancy time. Under these conditions, the terminal device only needs to perform shorter LBT (i.e. LBT Type 2 as mentioned above), or no LBT or sensing at all, (i.e. Category 1 LBT). The exact parameterization of the network devices category 4 LBT depends on the channel access priority class p, which is represented in table as below.

TABLE 2

Channel Access Priority Class

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} | where $CW_{min,p}$ may be referred to as minimum contention window size, $CW_{max,p}$ may be referred to as maximum contention window size, $T_{mcot,p}$ may be referred to as maximum channel occupancy time and $CW_p$ may be referred to as set of allowed contention window sizes.

When channel occupancy for UL transmissions (i.e. COT sharing) initiated by the network device is used, the assumption is that the CAPC value of the uplink channels or data must be the same or lower than the network device assumed (lower CAPC value has higher priority). That is, the priority of the uplink data must be the same or higher than that of downlink data. To facilitate a proper selection of the uplink data, the network device may indicate the value of CAPC in uplink grant to the UE when performing category 4 LBT and initiating the COT.

For example, it has been agreed that if the network device indicates Type 2 channel access procedure for the terminal device in the DCI, the network device indicates the channel access priority class used to obtain access to the channel in the DCI.

However, there is no such restriction in LCP (Logical Channel Prioritization) procedure in the terminal device about data of logical channels with which CAPC can be included in uplink transmission. The indicated CAPC in the DCI is not considered at all even though in the specification it is stated CAPC is indicated for type 2. It was left to network device to ensure it gives the correct grant based on the downlink traffic, the latest Buffer Status Report (BSR) received from the terminal device and received UL traffic. But BSR has a rough granularity and is reported per Logical Channel Group (LCG), and does not always contain up-to-date information for all the LCHs having data available for transmission. For instance, the network may group LCHs with similar LCP priorities while such LCHs may still have different CAPC. It might happen that the terminal device does not have data with higher or equal priority as the CAPC indicated in the DCI. In such case the data multiplexed into the allocated UL resources may not comply with the CAPC restrictions indicated for the grant/COT which impacts to the fairness negatively.

Therefore, embodiments according to the present disclosure proposed a method for accessing the channel based on the CAPC. The terminal device may obtain the data priority expected for the uplink transmission from DCI transmitted from the network device and schedule the uplink transmission based on the value of the CAPC.

Principle and implementations of the present disclosure will be described in detail below with reference to FIG. 2, which shows a flowchart of an example method 200 of channel access procedure based on the CAPC according to some example embodiments of the present disclosure. The method 200 can be implemented at the terminal device 120 as shown in FIG. 1. For the purpose of discussion, the method 200 will be described with reference to FIG. 1.

Figure 2:
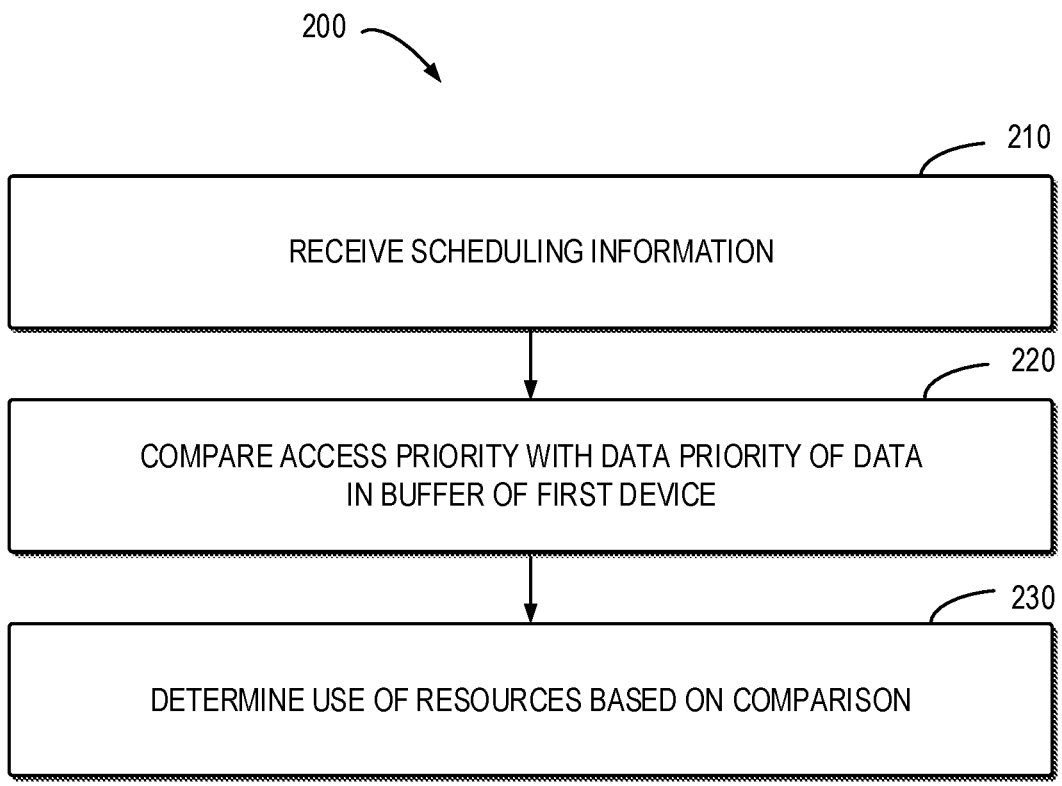
FIG. 2 shows a flowchart of an example method 200 of channel access procedure based on the CAPC according to some example embodiments of the present disclosure.

As shown in FIG. 2, at 210, the terminal device 120 receives scheduling information from the network device 120. The scheduling information herein used may be referred to as DCI which may be used for scheduling uplink transmission, i.e. the transmission from the terminal device 120 to the network device 110.

The scheduling information may comprise various indications. For example, the scheduling information may comprise resources in both of time-domain and frequency-domain allocated for the uplink transmission, information associated with channel access, for example, an expected access priority of the channel for the uplink transmission and a channel access type, for example, a LBT type.

The access priority class of channel herein used may be referred to as CAPC as mentioned above. Four Channel Access Priority Classes are defined in TS 36.213 which can be used when performing uplink and downlink transmissions in LAA carriers. The table (represented as below) shows which Channel Access Priority Class should be used by traffic belonging to the different standardized (QoS Class Identifiers). A non-standardized QCI (i.e. Operator specific QCI) should use suitable Channel Access Priority Class based on the below table, i.e. the Channel Access Priority Class used for a non-standardized QCI should be the Channel Access Priority Class of the standardized QCIs which best matches the traffic class of the non-standardized QCI. In this table, lower CAPC value has higher priority.

TABLE 3

Mapping between Channel Access Priority Classes and QCI

| Channel Access Priority Class (p) | QCI |
|---|---|
| 1 | 1, 3, 5, 65, 66, 69, 70 |
| 2 | 2, 7 |
| 3 | 4, 6, 8, 9 |
| 4 | — |

The scheduling information may also comprise a time interval for checking channel availability. The procedure for checking the channel availability may refer to LBT procedure. As mentioned above, there are 2 types of LBT. The time duration for type 1 LBT procedure may be based on the exponential back-off, which means the type 1 LBT procedure may require a longer sensing time. The LBT procedure in the present solution may refer to the type 2 LBT and the duration for checking channel availability/sensing the channel occupy is quite short, because the type 1 LBT procedure has been finished at the network device 110.

Referring to FIG. 2, at 220, the terminal device 120 compares the expected access priority, which is determined from the scheduling information, with an access priority of data in a buffer of the terminal device 120. Access priority here may refer to channel access priority class.

Each data in the buffer may have an access priority, which may depend on the service type associated with data. Only data with an access priority equal or higher than the expected access priority may be transmitted on the channel with COT sharing. Thus, the terminal device 120 may determine whether the buffer contains data having an access priority that exceeds the expected access priority. That is, the access priority of data to be transmitted on the channel with COT sharing cannot be lower than the expected access priority if there is no equal or higher priority data included in the Transmission Block (TB).

For the case that the buffer contains data having an access priority that exceeds the expected access priority, the terminal device 120 may build a transport block from data and transmit the TB on the resources allocated for the uplink transmission. However, it may be possible that the access priority of each data in the buffer is lower than the expected access priority. Thus, at 230, the terminal device 120 determines use of the resources based on the comparison.

If the access priority of each data in the buffer is lower than the expected access priority, the terminal device 120 may fall back to the type 1 LBT procedure for checking channel availability for the data having lower access priority, which may require more sensing time. That is, the terminal device 120 may change the channel access type from the type 2 LBT to the type 1 LBT.

The time duration for a LBT procedure with the exponential back-off may depend on the data having a lowest access priority multiplexed into the TB. This may be applicable to the case of the terminal device 120 change the channel access type from the type 2 LBT to the type 1 LBT as described above, as well as the case of the terminal device 120 was indicated with the type 1 LBT from the scheduling information. Thus, a time interval, which may be considered as a gap between the DL transmission and the UL transmission, scheduled by the network device 110 may not be sufficient for the LBT procedure with the exponential back-off.

Figure 3:
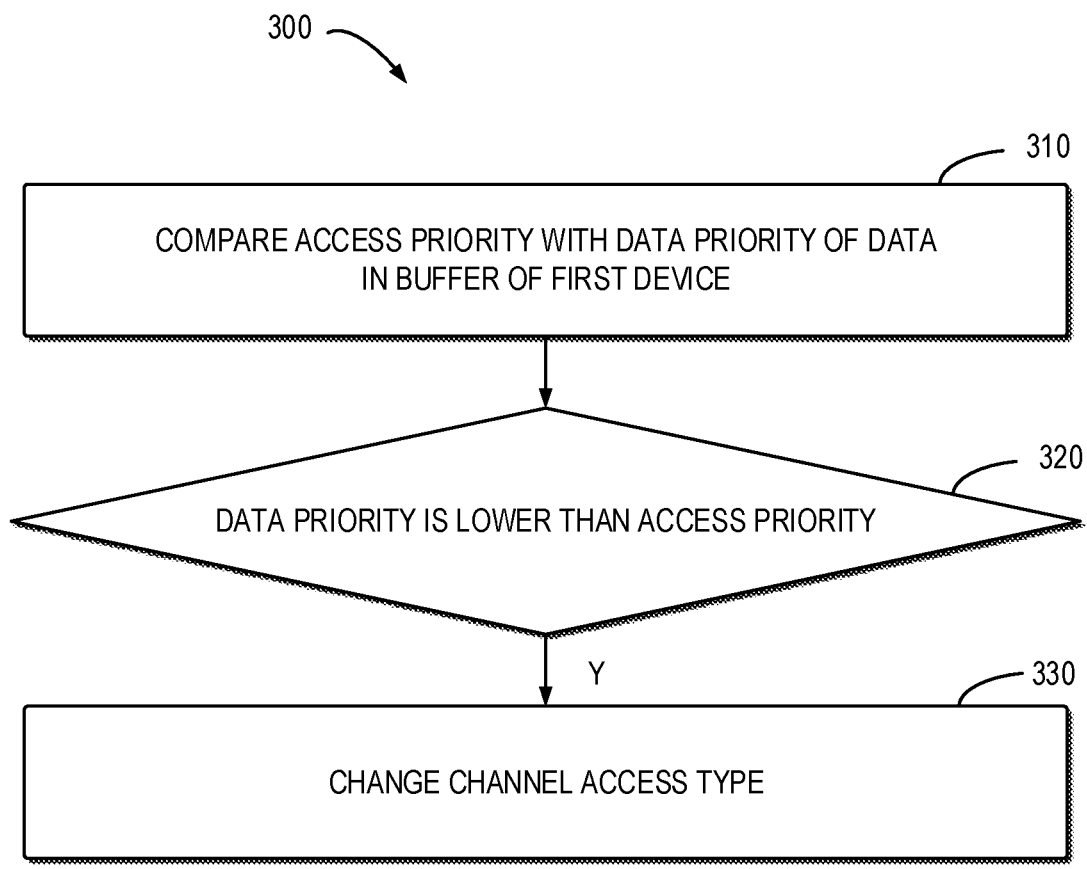
FIG. 3 shows a flowchart of an example method 300 of channel access procedure based on the CAPC according to some example embodiments of the present disclosure.

If the procedure of LBT with the exponential back-off is not finished within this time interval, the time interval for checking the channel availability may be extended. However, the extended time interval may be overlapped with the time-domain resources allocated for the UL transmission and the time-domain resources allocated for the UL transmission may be adjusted. With reference to FIG. 3, the LBT procedure performed at the terminal device 120 may be described in detail as below.

FIG. 3 shows a flowchart of an example method 300 of channel access procedure based on the CAPC according to some example embodiments of the present disclosure. The method 300 can be implemented at the terminal device 120 as shown in FIG. 1. For the purpose of discussion, the method 300 will be described with reference to FIG. 1.

As shown in FIG. 3, at 310, the terminal device 120 compares the expected access priority with an access priority of data in a buffer of the terminal device 120, which is equal to the action 220 in the method 200. The access priority of the data could be the highest priority of the data to be multiplex in the TB.

At 320, if the terminal device 120 determines that the access priority of data in the buffer is lower than the expected access priority, in other words, none of data contained in the buffer having the access priority that exceeds the expected access priority, in a case of the indicated channel access type is the type 2 LBT, at 330, the terminal device 120 may change the channel access type to type 1 LBT. The terminal device 120 may determine a time interval for checking a channel availability to transmit the data in the buffer.

As mentioned above, the type 1 LBT uses exponential back-off and requires more time to sensing the UL transmission for the data having lower access priority multiplexed into the TB. If the terminal device 120 determines the procedure of LBT with the exponential back-off is not finished within this time interval, the terminal device 120 may extend the time interval for checking the channel availability.

As mentioned above, the time interval for LBT procedure scheduled by the network device 110 is not sufficient for the LBT procedure to be performed in the terminal device 120 and the time interval for LBT procedure may be extended. That is, the time interval for LBT procedure may be overlapped with the time-domain resource allocated for the uplink transmission. If the terminal device 120 determines that the extended time interval is overlapped with the time-domain resources for the transmission, the terminal device 120 may adjust range of the time-domain resources for the transmission based on the extended time interval for LBT procedure.

Figure 4:
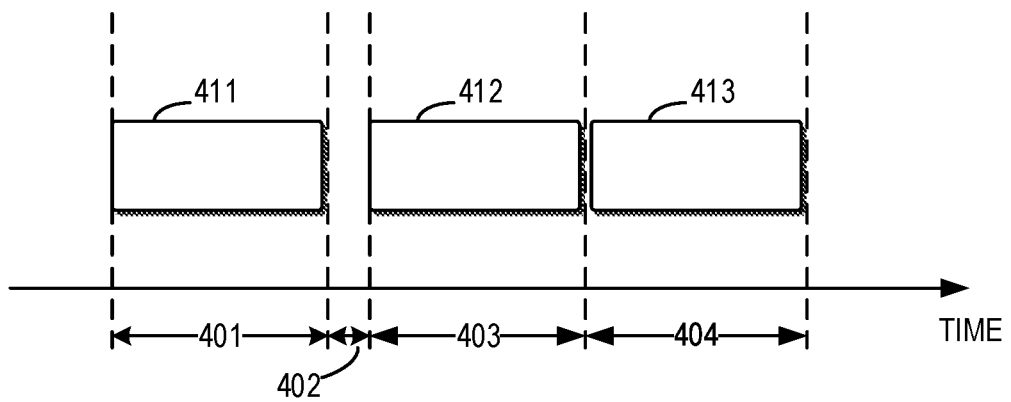
FIGS. 4-6 show diagrams of example LBT procedures according to some example embodiments of the present disclosure.
Figure 5:
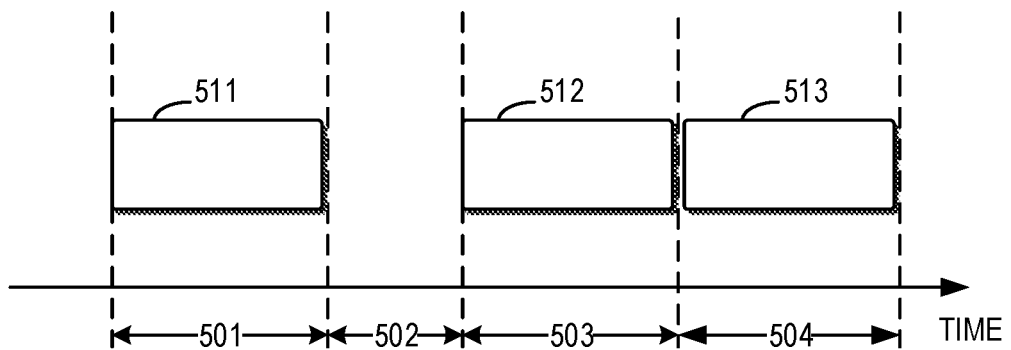
Figure 6:
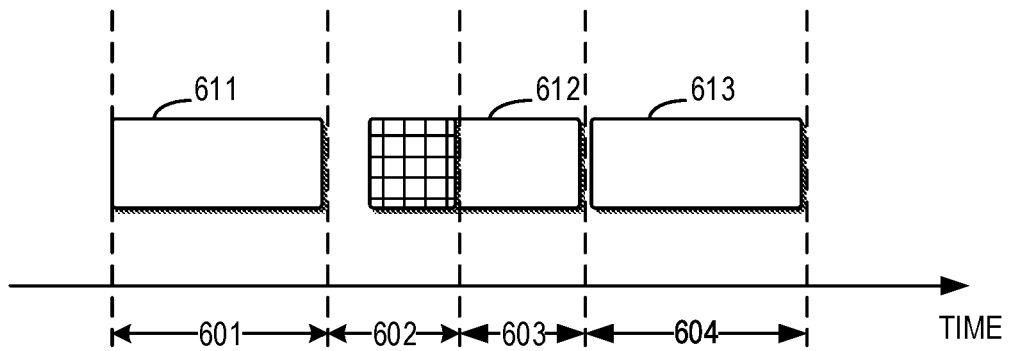

FIGS. 4-6 show diagrams of example LBT procedures according to some example embodiments of the present disclosure. With reference to FIGS. 4-6, the adjusting of the range of the time-domain resources for the uplink transmission may be better understood.

As shown in FIG. 4, the terminal device 120 receives scheduling information on the resources 411 for downlink transmission in the time interval 401. The terminal device 120 may determine that the resources 412 and 413 for uplink transmission may be started at the starting point of the time interval 403 and the terminal device 120 may perform the uplink transmission in the time interval 403 and 404. The time interval 402 may be used for checking the channel availability, i.e. performing a LBT procedure, which has been already scheduled and indicated in the DCI. It can be seen that the interval is quite short and typically 25 μs.

In some example embodiments, in order to sense the channel with a longer time, the terminal device 120 may postpone the time-domain resources (the time interval 403 and 404) allocated for the uplink transmission. The terminal device 120 may determine the starting point of time-domain resources allocated for the uplink transmission based on the scheduling information and postpone the starting point based on the extended time interval.

The postponed time period may be preconfigured and for example, may be a predetermined number of symbols. As shown in FIG. 5, the terminal device 120 receives scheduling information on the resources 511 for downlink transmission in the time interval 501. Compared with FIG. 4, the resources 512 and 513 for uplink transmission are postponed and the time interval 502 for LBT procedure performed at the terminal device 120 increases.

In some example embodiments, the terminal device 120 may reserve the time-domain resources allocated for the uplink transmission. For this case, the terminal device 120 may the starting point of time-domain resources allocated for the uplink transmission based on the scheduling information and reserve a time period for the extended time interval from the starting point of resources. During the reserved time period, the UL transmission is suspend.

The predetermined time period may be preconfigured and for example, may be a predetermined number of symbols. As shown in FIG. 6, the terminal device 120 receives scheduling information on the resources 611 for downlink transmission in the time interval 501. Compared with FIG. 4, part of the resources 612 for uplink transmission are reserved for the LBT procedure and the time interval 602 for LBT procedure performed at the terminal device 120 increases.

In some example embodiments, the terminal device 120 may reserve the first set of resource in a plurality of continuous resource sets allocated for the uplink transmission. For example, the entire of resources 512 may be used for LBT procedure.

As another option, if the terminal device 120 determines that the access priority of data in the buffer is lower than the expected access priority, the terminal device 120 may skip the uplink transmission on the resources. In other words, the terminal device 120 may not build a transport block to be transmitted from the data in the buffer.

As a further option, if the terminal device 120 determines that the data priority of data in the buffer is lower than the access priority, the terminal device 120 may generate an indication of the access priority for the data in the buffer and transmit the indication to the network device 110 on the resources.

As a further option, if the terminal device 120 determines that the data priority of data in the buffer is lower than the access priority, the terminal device 120 may transmit a BSR on the resources to the network device 110.

In some example embodiments, the network device 110 may also indicate to the terminal device 120 via e.g. RRC signalling which of the above behaviours the terminal device 120 should apply, in case it has no data with high-enough priority to transmit in a shared network device 110-initiated COT.

In this way, the COT sharing can be used only for the data with higher or equal priority to avoid unintended usage of the grant on unlicensed band and coexistence fairness among nodes with different types of traffic to be transmitted may be achieved.

In some example embodiments, an apparatus capable of performing the methods 200 (for example, implemented at the terminal device 120) may comprise means for performing the respective steps of the method 200. The means may be implemented in any suitable form. For example, the means may be implemented in a circuitry or software module.

In some example embodiments, the apparatus comprises means for receiving scheduling information from a second device, the scheduling information at least indicating resources allocated for a transmission from the first device to the second device, a channel access type for the transmission and an expected access priority for the transmission; means for comparing the expected access priority with an access priority of data in a buffer of the first device; and means for determining use of the resources based on the comparison.

In some example embodiments, the apparatus further comprises means for in response to a determination that the channel access type is a LBT without exponential back-off and the access priority of the data is lower than the expected access priority, changing channel access type to a LBT with exponential back-off.

In some example embodiments, the means for changing the channel access type comprises means for determining a time interval for checking a channel availability to transmit the data in the buffer and means for in response to determining that a procedure of LBT with the exponential back-off is not finished within the time interval, extending the time interval for checking the channel availability to transmit the data in the buffer.

In some example embodiments, the apparatus further comprises means for in response to determining that the extended time interval is overlapped with the time-domain resources for the transmission, adjusting range of the time-domain resources for the transmission based on the extended time interval.

In some example embodiments, the means for adjusting the time-domain resources allocated for the transmission comprises means for determining, based on the scheduling information, a starting point of time-domain resources allocated for the transmission and means for postponing the starting point based on the extended time interval.

In some example embodiments, the means for adjusting the time-domain resources allocated for the transmission comprises: means for determining, based on the scheduling information, a starting point of time-domain resources allocated for the transmission and means for reserving a time period for the extended time interval from the starting point of resources, wherein the transmission is suspended during the reserved time period.

In some example embodiments, the means for determining the use of the resources comprises means for in response to a determination that the access priority of the data for transmission is lower than the expected access priority, skipping the transmission on the resources.

In some example embodiments, the means for determining the use of the resources comprises means for in response to a determination that the access priority of the data for transmission is lower than the expected access priority, generating an indication of the data priority; and means for transmitting the indication to the second device on the resources.

In some example embodiments, the means for determining the use of the resources comprises means for in response to a determination that the access priority of the data for transmission is lower than the expected access priority, transmitting a Buffer Status Report (BSR) to the second device on the resources.

In some example embodiments, the access priority comprises channel access priority class.

Figure 7:
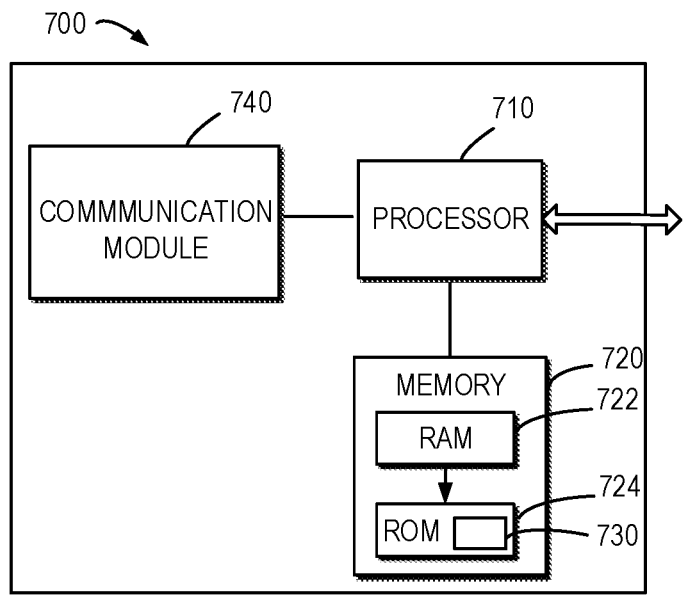
FIG. 7 shows a simplified block diagram of a device that is suitable for implementing example embodiments of the present disclosure.

FIG. 7 is a simplified block diagram of a device 700 that is suitable for implementing embodiments of the present disclosure. The device 700 may be provided to implement the communication device, for example the terminal device 120 and the network device 110 as shown in FIG. 1. As shown, the device 700 includes one or more processors 710, one or more memories 740 coupled to the processor 710, and one or more transmitters and/or receivers (TX/RX) 740 coupled to the processor 710.

The TX/RX 740 is for bidirectional communications. The TX/RX 740 has at least one antenna to facilitate communication. The communication interface may represent any interface that is necessary for communication with other network elements.

The processor 710 may be of any type suitable to the local technical network and may include one or more of the following: general purpose computers, special purpose computers, microprocessors, digital signal processors (DSPs) and processors based on multicore processor architecture, as non-limiting examples. The device 700 may have multiple processors, such as an application specific integrated circuit chip that is slaved in time to a clock which synchronizes the main processor.

The memory 720 may include one or more non-volatile memories and one or more volatile memories. Examples of the non-volatile memories include, but are not limited to, a Read Only Memory (ROM) 724, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 722 and other volatile memories that will not last in the power-down duration.

A computer program 730 includes computer executable instructions that are executed by the associated processor 710. The program 730 may be stored in the ROM 1020. The processor 710 may perform any suitable actions and processing by loading the program 730 into the RAM 720.

The embodiments of the present disclosure may be implemented by means of the program 730 so that the device 700 may perform any process of the disclosure as discussed with reference to FIGS. 2 to 6. The embodiments of the present disclosure may also be implemented by hardware or by a combination of software and hardware.

Figure 8:
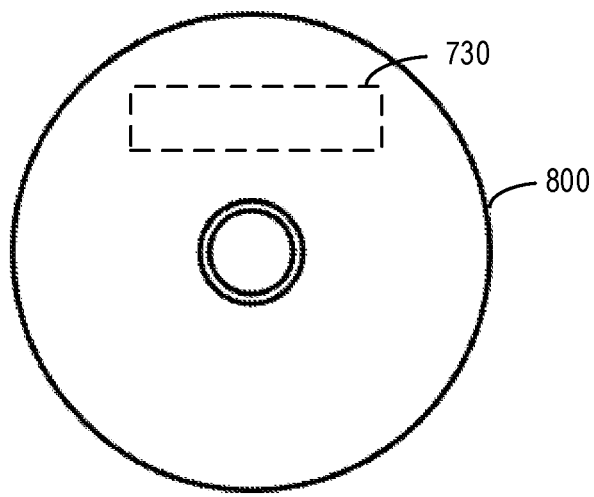
FIG. 8 shows a block diagram of an example computer readable medium in accordance with some embodiments of the present disclosure.

In some embodiments, the program 730 may be tangibly contained in a computer readable medium which may be included in the device 700 (such as in the memory 720) or other storage devices that are accessible by the device 700. The device 700 may load the program 730 from the computer readable medium to the RAM 722 for execution. The computer readable medium may include any types of tangible non-volatile storage, such as ROM, EPROM, a flash memory, a hard disk, CD, DVD, and the like. FIG. 8 shows an example of the computer readable medium 800 in form of CD or DVD. The computer readable medium has the program 730 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 500 and 600 as described above with reference to FIGS. 2-6. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. An apparatus comprising:
   at least one processor; and
   at least one memory including computer program codes;
   the at least one memory and the computer program codes are configured to, with the at least one processor, cause the apparatus at least to:
      receive scheduling information from a device, the scheduling information at least indicating: time-domain resources allocated for a transmission from the apparatus to the device, a channel access type for the transmission, and an expected access priority for the transmission, wherein the apparatus is a terminal device and the device is a network device; and
      compare the expected access priority with an access priority of data in a buffer of the apparatus, wherein the access priority comprises channel access priority class, wherein each data in the buffer has an access priority, which depends on a service type associated with data, wherein only data with access priority equal to or higher than the expected access priority may be transmitted on the channel with Channel Occupancy Time (COT) sharing, and wherein the access priority of data to be transmitted on the channel with COT sharing cannot be lower than the expected access priority if there is no equal or higher priority data included in a transmission block;
      determine use of the time-domain resources based on the comparison;
   in response to a determination that the channel access type is a listen before talk without exponential back-off and the access priority of the data is lower than the expected access priority, change channel access type to a listen before talk with exponential back-off;
   wherein the apparatus is caused to change the channel access type by:
      determining a time interval for checking a channel availability to transmit the data in the buffer; and
      in response to determining that a procedure of listen before talk with exponential back-off is not finished within the time interval, extending the time interval for checking the channel availability to transmit the data in the buffer;
   in response to determining that the extended time interval is overlapped with the time-domain resources for the transmission, adjust the time-domain resources allocated for the transmission based on the extended time interval;
   wherein the apparatus is caused to adjust the time-domain resources allocated for the transmission by:
      determining, based on the scheduling information, a starting point of the time-domain resources allocated for the transmission;
      postponing the starting point based on the extended time interval; and
      reserving a time period for the extended time interval from the starting point of the time-domain resources, wherein the transmission is suspended during the reserved time period.

* * * * *